(12) United States Patent
Van Horn et al.

(10) Patent No.: US 8,772,364 B2
(45) Date of Patent: *Jul. 8, 2014

(54) BLOWING AGENT COMPOSITIONS OF HYDROFLUOROOLEFINS AND HYDROCHLOROFLUOROOLEFINS

(71) Applicant: Arkema Inc., King of Prussia, PA (US)

(72) Inventors: Brett L. Van Horn, King of Prussia, PA (US); Maher Y. Elsheikh, Wayne, PA (US); Benjamin Bin Chen, Wayne, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,711

(22) Filed: Jun. 11, 2013

(65) Prior Publication Data

US 2013/0281557 A1    Oct. 24, 2013

Related U.S. Application Data

(63) Continuation-in-part of application No. 12/532,238, filed as application No. PCT/US2008/058594 on Mar. 28, 2008, now abandoned.

(60) Provisional application No. 60/908,762, filed on Mar. 29, 2007.

(51) Int. Cl.
  *C08J 9/14* (2006.01)
  *C08J 9/00* (2006.01)
  *C07C 21/18* (2006.01)

(52) U.S. Cl.
USPC .......... 521/98; 521/131; 570/126; 428/304.4; 252/182.15

(58) Field of Classification Search
USPC ................. 521/98, 131; 252/182.15
See application file for complete search history.

(56) References Cited

U.S. PATENT DOCUMENTS

| | | | |
|---|---|---|---|
| 2004/0256594 A1* | 12/2004 | Singh et al. | 252/71 |
| 2006/0142173 A1* | 6/2006 | Johnson et al. | 510/407 |
| 2007/0010592 A1* | 1/2007 | Bowman et al. | 521/131 |
| 2010/0087555 A1* | 4/2010 | Vo et al. | 521/56 |

* cited by examiner

*Primary Examiner* — Kara Boyle
(74) *Attorney, Agent, or Firm* — Steven D. Boyd

(57) ABSTRACT

The present invention relates to blowing agent compositions comprising (1) at least one hydrofluoroolefin (HFO) and (2) at least one hydrochlorofluoroolefin (HCFO) used in the preparation of foamable thermoplastic compositions. The HFOs of component (1) include, but are not limited too, 3,3,3-trifluoropropene (HFO-1243zf), 1,2,3,3,3-pentafluoropropene (HFO-1225ye), cis- and/or trans-1,3,3,3-tetrafluoropropene (HFO-1234ze), and 2,3,3,3-tetrafluoropropene (HFO 1234yf), and mixtures thereof. The HCFOs of component (2) include, but are not limited to, 1-chloro-3,3,3-trifluoropropene (HCFO-1233zd), 2-chloro-3,3,3-trifluoropropene (HCFO-1233xf) and mixtures thereof. The blowing agent compositions are useful in the production of low density insulating foams with improved k-factor.

17 Claims, 1 Drawing Sheet

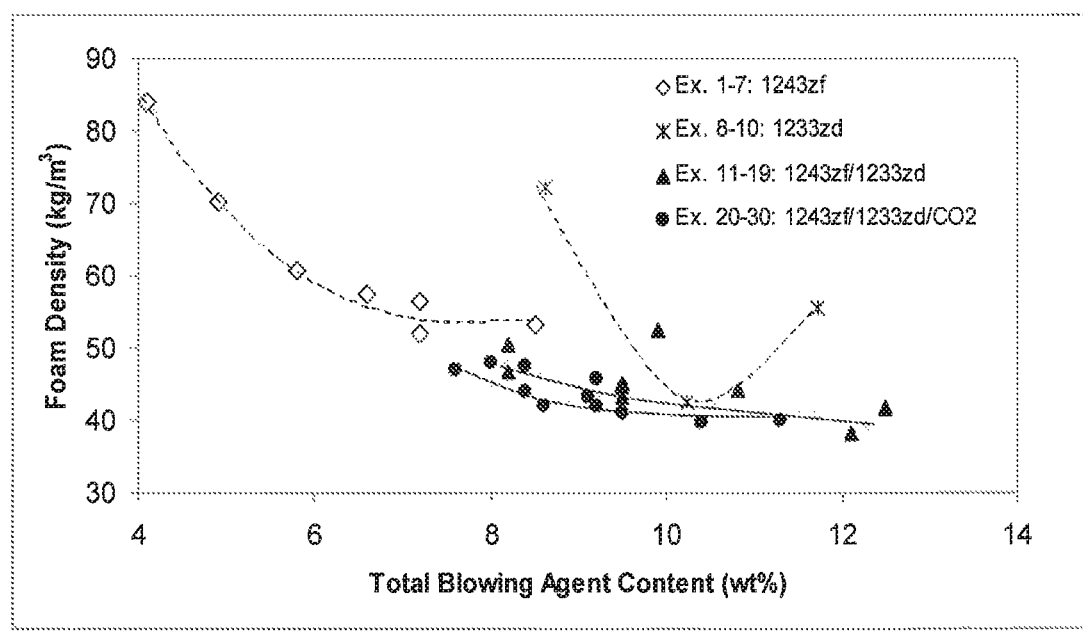

US 8,772,364 B2

BLOWING AGENT COMPOSITIONS OF HYDROFLUOROOLEFINS AND HYDROCHLOROFLUOROOLEFINS

This application is a continuation-in-part of U.S. application Ser. No. 12/532,238 filed Sep. 21, 2009, which claimed priority to international application serial number PCT/US08/58594 filed Mar. 28, 2008 which application designated the United States and which claimed priority to U.S. provisional application Ser. No. 60/908,762 filed Mar. 29, 2007.

SUMMARY OF INVENTION

The present invention relates to blowing agent compositions comprising (1) at least one hydrofluoroolefin (HFO) and (2) at least one hydrochlorofluoroolefin (HCFO) used in the preparation of foamable thermoplastic compositions. The HFOs of component (1) include, but are not limited too, 3,3,3-trifluoropropene (HFO-1243zf), 1,2,3,3,3-pentafluoropropene (HFO-1225ye), cis- and/or trans-1,3,3,3-tetrafluoropropene (HFO-1234ze), and 2,3,3,3-tetrafluoropropene (HFO 1234yf), and mixtures thereof. HCFOs of component (2) include, but are not limited to, 1-chloro-3,3,3-trifluoropropene (HCFO-1233zd), 2-chloro-3,3,3-trifluoropropene (HCFO-1233xf), dichloro-fluorinated propenes, and mixtures thereof. The blowing agent compositions are useful in the production of low density insulating foams with improved k-factor.

BACKGROUND OF INVENTION

With the continued concern over global climate change there is an increasing need to develop technologies to replace those with high ozone depletion potential (ODP) and high global warming potential (GWP). Though hydrofluorocarbons (HFC), being non-ozone depleting compounds, have been identified as alternative blowing agents to chlorofluorocarbons (CFCs) and hydrochlorofinomearbons (HCFCs) in the production of thermoplastic foams, they still tend to have significant GWP.

Hydrofloroolefins, such as HFO-1243zf, (cis/trans)-HFO-1234ze, HFO-1234yf, and (E/Z)-HFO-1225ye, have been identified as potential low GWP blowing agents for the production of thermoplastic foams, including extruded polystyrene foams for thermal insulation.

It was discovered that blowing agent compositions comprising at least one hydrofluoroolefin with at least one hydrochlorofluoroolefin can permit the production of lower density, closed-cell foam with good k-factor which will be particularly useful for thermal insulating foams. This invention may also permit the production of low density, closed-cell foams with enlarged, controlled cell size.

WO 2004/037913, WO 2007/002703, and US Pat. Publication 2004119047 disclose blowing agents comprising halogenated alkenes of generic formula that would include numerous HFOs and HCFOs, among many other materials including brominated and iodinated compounds. The specific combination of HFOs with HCFOs in blowing agent compositions is not disclosed. Specific examples are shown for blowing agent compositions for foaming polystyrene comprising HFOs, specifically HFO-1234ze and HFO-1234yf, either alone or in combination with an HFC, and blowing agent compositions for PUR foaming comprising HCFO-1233zd. No examples of blowing agents combinations comprising HFOs and HCFOs are disclosed.

GB 950,876 discloses a process for the production of polyurethane foams. It discloses that any suitable halogenated saturated or unsaturated hydrocarbon having a boiling point below 150° C., preferably below 50° C., can be used as the blowing agent. Trichlorofluoroethene, chlorotrifluoroethene, and 1,1-dichloro-2,2-difluoroethene are disclosed in a list of suitable blowing agents along with 3,3,3-trifluoropropene. Hydrochlorofluoropropenes are not specifically disclosed nor are longer chain HCFOs nor other HFOs besides 3,3,3-trifluoropropene. There is no disclosure related to blowing agents for thermoplastic foaming, nor are the benefits of HCFOs in thermoplastic foaming mentioned, nor are the benefits of blowing agent combinations comprising HCFOs and HFOs.

CA 2016328 discloses a process for preparing closed-cell, polyisocyanate foam. Disclosed are organic compound blowing agents including halogenated alkanes and alkenes, where the alkene is propylene, and the halogenated hydrocarbons can be chlorofluorocarbons. Among the many exemplary compounds listed are specific chlorofluoroethylenes containing 1 chlorine and from 1 to 3 fluorines along with specific pentafluoropropene, tetrafluoropropene, and difluoropropene. Hydrochlorofluoropropenes are not specifically disclosed nor are longer chain HCFOs. There is no disclosure related to blowing agents for thermoplastic foaming, nor are the benefits of HCFOs in thermoplastic foaming mentioned, nor are the benefits of blowing agent combinations comprising HCFOs and HFOs.

BRIEF DESCRIPTION OF THE DRAWINGS

FIG. 1 is a graph of total blowing agent content versus foam density for examples 19-48.

DETAILED DESCRIPTION OF INVENTION

The present invention relates to the use of blowing agents with negligible ozone-depletion and low GWP comprising (1) at least one hydrofluoroolefin (HFO) and (2) at least on hydrochlorofluoroolefin (HCFO). The present invention discloses blowing agent and foamable resin compositions useful for the production of thermoplastic foams, which may be polystyrene, polyethylene, polypropylene, or mixtures thereof, with decreased density and improved k-factor that can be used as insulating foams. In a preferred embodiment of this invention the HFO in component (1) is a C3 through C5 fluorinated alkene such as 3,3,3-trifluoropropene (HFO-12434zf); (cis and/or trans)-1,3,3,3-tetrafluoropropene (HFO-1234ze), particularly the trans isomer; 2,3,3,3-tetrafluoropropene (HFO-1234yf); (cis and/or trans)-1,2,3,3,3-pentafluoropropene (HFO-1225ye) and mixtures thereof. The HCFO of component (2) is preferably (cis and/or trans)-1-chloro-3,3,3-trifluoropropene (HCFO-1233zd), particularly the trans isomer, 2-chloro-3,3,3-trifluoropropene (HCFO-1233xf), 1,1-dichloro-3,3,3-trifluoropropene, 1,2-dichloro-3,3,3-trifluoropropene, and mixtures thereof.

The blowing agent composition of the present invention may further comprise co-blowing agents such as hydrofluorocarbons, alkanes, carbon dioxide, methyl formate, inert gases, atmospheric gases, alcohols, ethers, fluorinated ethers, unsaturated fluorinated ethers, ketones, fluoroketones, water, and mixtures thereof. The hydrofluorocarbons may be selected from HFC-32, HFC-161, HFC-152, HFC-152a, HFC-143, HFC-143a, HFC-134, HFC-134a, HFC-125, HFC-245fa, HFC-365mfc, HFC-227ea, or mixtures thereof. The alkanes may be selected from propane, butane, pentane, such as n-pentane, cyclopentane, iso-pentane or mixtures thereof, or hexane. The alcohols may be selected from ethanol, iso-propanol, butanol, ethyl hexanol, methanol, or mixtures thereof. The ethers may be selected from dimethyl ether, diethyl ether, methylethyl ether, or mixtures thereof. The ketones may be selected from acetone, methyl ethyl ketone, or mixtures thereof. In addition, the blowing agent composition of the present invention may further comprise additives such as dyes, pigments, cell-controlling agents, fillers, antioxidants, extrusion aids, stabilizing agents, antistatic agents, fire retardants, IR attenuating agents, thermally insulating additives, plasticizers, viscosity modifiers, impact modifiers, gas barrier resins, carbon black, surfactants, and mixtures thereof.

Another embodiment of this invention are foamable resin compositions containing greater than about 1 parts per hundred (pph) and less than about 100 pph of the blowing agent composition with respect to resin, preferably greater than about 2 pph and less than about 40 pph, more preferably greater than about 3 pph and less than about 25 pph, and even more preferably greater than about 4 pph and less than about 15 pph of the blowing agent composition with respect to resin.

Another embodiment of this invention is a thermoplastic foam comprising a blowing agent with negligible ozone-depletion and low GWP comprising at least one hydrofluoroolefin (HFO) and at least one hydrochlorofluoroolefin (HCFO). The thermoplastic foams of the present invention exhibit a decreased density and improved k-factor and can be used as insulating foams. In a preferred embodiment of this invention the blowing agent can comprise an HFO component selected from 3,3,3-trifluoropropene (HFO)-1243zf); (cis and/or trans)-1,3,3,3-tetrafluoropropene (HFO-1234ze), particularly the trans isomer; 2,3,3,3-tetrafluoropropene (HFO-1234yf); (cis and/or trans)-1,2,3,3,3-pentafluoropropene (HFO-1225ye) and mixtures thereof. The HCFO component of the blowing agent can be selected from (cis and/or trans)-1-chloro-3,3,3-trifluoropropene (HCFO-1233zd), particularly the trans isomer, 2-chloro-3,3,3-trifluoropropene (HCFO-1233xf), 1,1-dichloro-3,3,3-trifluoropropene, 1,2-dichloro-3,3,3-trifluoropropene, and mixtures thereof. In one embodiment of the present invention, the thermoplastic foam has a density below about 50 kg/m$^3$ at a blowing agent loading of from about 7 to about 13 wt %, and preferably a density of between about 38 and 50 kg/m$^3$ at a blowing agent loading of from about 7 to about 13 wt %. In another embodiment of this invention, the thermoplastic foam has a density of less than about 70 kg/m$^3$, preferably from about 24 kg/m$^3$ to about 50 kg/m$^3$ and most preferably from about 38 kg/m$^3$ to about 50 kg/m$^3$. In another embodiment of this invention, the thermoplastic foam is a closed-cell foam, preferably with an open-cell content of less than about 20%, more preferably less than about 10%. In another embodiment of this invention, the thermoplastic foam has a fine cell structure, preferably with an average cell size of from about 0.05 mm to about 1.0 mm, more preferably from about 0.05 mm to about 0.5 mm.

In another embodiment of this invention, the blowing agent comprises from about 1 to about 99 wt % of the HCFO component, preferably from about 2 to about 90 wt % of the HCFO component. In embodiment of this invention, the blowing agent comprises more than about 10 wt % of the HCFO component. In embodiment of this invention, the blowing agent comprises more than about 20 wt % of the HCFO component. In embodiment of this invention, the blowing agent comprises more than about 30 wt % of the HCFO component. In embodiment of this invention, the blowing agent comprises less than about 70 wt % of the HCFO component. In embodiment of this invention, the blowing agent comprises less than about 65 wt % of the HCFO component. In embodiment of this invention, the blowing agent comprises less than about 60 wt % of the HCFO component. In embodiment of this invention, the blowing agent comprises less than about 50 wt % of the HCFO component. In another embodiment of the this invention, the blowing agent comprises more than about 20 wt % of the HFO component. In another embodiment of this invention, the blowing agent comprises more than about 30 wt % of the HFO component. In another embodiment of this invention, the blowing agent comprises more than about 40 wt %, of the HFO component. In another embodiment of this invention, the blowing agent comprises more than about 50 wt % of the HFO component. In another embodiment of this invention, the blowing agent comprises more than about 60 wt % of the HFO component. In another embodiment of this invention, the blowing agent comprises more than about 70 wt % of the HFO component. In another embodiment of this invention, the blowing agent comprises more than about 90 wt % of the HFO component. In another embodiment of this invention, the blowing agent comprises from about 50 wt % to about 98 wt % of the HFO component.

The process for preparing a foamed thermoplastic product, which may be polystyrene, polyethylene, polypropylene, or mixtures thereof, is as follows: Prepare a foamable polymer composition by blending together components comprising foamable polymer composition in any order. Typically, prepare a foamable polymer composition by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin near or above its glass transition temperature (Tg), or melt temperature (Tm) for crystalline polymers.

A foamable polymer composition can contain additional additives such as nucleating agents, cell-controlling agents, dyes, pigments, fillers, antioxidants, extrusion aids, stabilizing agents, antistatic agents, fire retardants, IR attenuating agents and thermally insulating additives. Nucleating agents include, among others, materials such as talc, calcium carbonate, sodium benzoate, and chemical blowing agents such as azodicarbonamide or sodium bicarbonate and citric acid. IR attenuating agents and thermally insulating additives can include carbon black, graphite, silicon dioxide, metal flake or powder, among others. Flame retardants can include, among others, brominated materials such as hexabromocyclodecane and polybrominated biphenyl ether.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam.

A semi-batch process involves preparing at least a portion of a foamable polymer composition and intermittently expanding that foamable polymer composition into a foam all in a single process. For example, U.S. Pat. No. 4,323,528, herein incorporated by reference, discloses a process for making polyolefin foams via an accumulating extrusion process. The process comprises: 1) mixing a thermoplastic material and a blowing agent composition to form a learnable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam.

A continuous process involves forming a foamable polymer composition and then expanding that foamable polymer composition in a non-stop manner. For example, prepare a foamable polymer composition in an extruder by heating a polymer resin to form a molten resin, blending into the molten resin a blowing agent composition at an initial pressure to form a foamable polymer composition, and then extruding that foamable polymer composition through a die into a zone at a foaming pressure and allowing the foamable polymer composition to expand into a foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another.

EXAMPLES

Examples 1-8

Solubility and Diffusivity of Gases in Polystyrene

The solubility and diffusivity of gases in polystyrene resin was measured using capillary column inverse gas chromatography (cc-IGC) as described in: Hadj Romdhane, Ilyess (1994) "Polymer-Solvent Diffusion and Equilibrium Parameters by Inverse Gas-Liquid Chromatography" PhD Dissertation, Dept. of Chem. Eng., Penn State University. and Hong S U, Alhouy A, Duda J L (1999) "Measurement and Prediction of Blowing Agent Solubility in Polystyrene at Supercritical Conditions" Cell Polym 18(5):301-313.

A 15 m long, 0.53 mm diameter GC capillary-column was prepared with a 3 micron thick polystyrene internal film coating. The column was installed into a Hewlett Packard 5890 Series II Gas Chromatograph with flame ionizer detector. Elution profiles for gases being tested were analyzed according the method outlined in the reference, using methane as the reference gas. The results give the diffusion coefficient of the gas through the polymer, $D_p$, and the solubility of the gas in the polymer in terms of the partition coefficient, K, which is the ratio of the concentration of the gas in the polymer phase to the concentration in the vapor phase. As such, the greater the value of K for a particular gas in the resin the greater its solubility in that resin.

Table 1 shows the partition coefficient and diffusivity values for several gases in polystyrene at 140° C. Comparative examples 1 and 2 show the solubility and diffusivity of two well studied blowing agents in polystyrene: HCFC-142b (1-chloro-1,1-difluoroethane) and HFC-134a (1,1,1,2-tetrafluoroethane). Examples 3-6 show the solubility and diffusivity of selected HFOs in polystyrene: HFO-1243zf (3,3,3-trifluoropropene), HFO-1234ze (1,3,3,3-tetrafluoropropene), HFO-1234yf (2,3,3,3-tetrafluoropropene), HFO-1225ye (1,2,3,3,3-pentafluoropropene). Examples 7 and 8 show the solubility and diffusivity of trans-HCFO-1233zd (1-chloro-3,3,3-trifluoropropene) and HCFO-1233xf (2-chloro-3,3,3-trifluoropropene), The good solubility and favorable diffusivity of the HCFOs in polystyrene indicate that they should be effective coblowing agents and/or processing aids for the production of thermoplastic foams using HFO blowing agents. The solubility of the HCFOs in polystyrene is sufficient to provide useful plasticization of the thermoplastic resin to assist in foaming. As can be seen, HCFO-1233xf has a solubility in polystyrene comparable to that of HCFC-142b.

TABLE 1

Partition Coefficient and Diffusivity of Gases in Polystyrene at 140° C. by Inverse Gas Chromatography

| Example | Gas | Bp (° C.) | Mw (g/mol) | K | Dp (cm$^2$/s) |
|---|---|---|---|---|---|
| 1 | HCFC-142b | −9.8 | 100.49 | 1.249 | 2.61E−08 |
| 2 | HFC-134a | −26.1 | 102.02 | 0.397 | 3.40E−08 |
| 3 | HFO-1243zf | −22 | 96.05 | 0.544 | 2.95E−08 |
| 4 | HFO-1234ze | −16 | 114.04 | 0.423 | 3.09E−08 |
| 5 | HFO-1225ye | −18 | 132.03 | 0.312 | 2.44E−08 |
| 6 | HFO-1234yf | −28.5 | 114.04 | 0.275 | >2E−08 |
| 7 | HCFO-1233zd | 20.5 | 130.5 | 2.326 | 1.72E−08 |
| 8 | HCFO-1233xf | 15 | 130.5 | 1.475 | 1.67E−08 |

Examples 9-18

Extruded polystyrene foam was produced using a counter-rotating twin screw extruder with internal barrel diameters or 27 mm and a barrel length of 40 diameters. The screw design was suitable for foaming applications. The pressure in the extruder barrel was controlled with the gear pump and was set high enough such that the blowing agent dissolved in the extruder. The extruder die for examples 10-18 was an adjustable-lip slot die with a gap width of 6.35 mm. For example 1, the die was a 2 mm diameter strand die with a 1 mm land length. Two grades of general purpose polystyrene were used for the extrusion trials and fed to the extruder at rates of either 2.27 or 4.54 kg/hr (5 or 10 lb/hr). Blowing agents were pumped into the polystyrene resin melt at a controlled rate using high pressure delivery pumps. In the extruder, the blowing agent is mixed and dissolved in the resin melt to produce an expandable resin composition. The expandable resin composition is cooled to an appropriate foaming temperature and then extruded from the die where the drop in pressure initiates foaming. Talc was used as a nucleating agent and was pre-blended with polystyrene to make a masterbatch of 50 wt % talc in polystyrene. Beads of this masterbatch were mixed with polystyrene pellets to achieve 0.5 wt % talc in each experiment.

The density, open cell content, and cell size was measured for foam samples collected during each run. Density was measured according to ASTM D792, open cell content was measured using gas pychnometry according to ASTM D285-C, and cell size was measured by averaging the cell diameters from scanning electron microscope (SEM) micrographs of foam sample fracture surfaces. SEM images are also used to observe the cell structure and qualitatively check for open cell content.

Table 2 shows data for examples 9 through 14, including the loading of each blowing agent in the formulation, the resin feed rate, melt flow index of the resin, the expandable resin melt temperature, and the density, cell size, and open cell content of the resulting foamed product.

Comparative example 9 is typical for polystyrene foaming with HFC-134a, where the poor solubility and difficulties in processing tend to lead to higher density foam with smaller size and more open cells.

Comparative examples 10 through 12 show results for foaming with 3,3,3-trifluoropene (HFO-1243zf; TFP). At a loading of 8.5 wt % TFP the resulting foam had smaller cell size while comparative density to examples 10 and 11.

In examples 13 and 14, blowing agent compositions of TFP (HFO-1243zf) and HCFO-1233zd permitted production of lower density foam than achievable with TFP alone along with a beneficial enlargement in the cell size, where it was possible to produce closed-cell foam product with cell sizes greater than 0.2 mm at densities less than 53 kg/m$^3$. These foams would be useful as thermal insulating foams with improved k-factor. The HCFO-1233zd was predominantly the trans-isomer.

Examples 15 and 16 were produced during using HFO-1234yf (2,3,3,3-tetrafluoroethane) as the only blowing agent. At a loading of 5.7 wt % 1234yf, as shown in example 16, the foamed product had very small cell size, macrovoids, blowholes, high open cell content, and frequent periods of popping at the die caused by undissolved blowing agent. Increasing the content of 1234yf made these problems worse. For examples 17 and 18, blowing agent compositions of HFO-1234yf and HCFO-1233zd permitted production of lower density foam than was produced using the HFO-1234yf alone. The foamed samples of examples 17 and 18 were of good quality, with few defects and produced without popping at the die.

The density, open cell content, and cell size was measured for foam samples collected during each run. Open cell content was measured using gas pychnometry according to ASTM D285-C, and cell size was measured by averaging the cell diameters from scanning electron microscope (SEM) micrographs of foam sample fracture surfaces. SEM images are also used to observe the cell structure and qualitatively check for open cell content.

Examples 19 to 25 were produced using HFO-1243zf as the only blowing agent at loadings ranging from 4.1 to 8.5 wt %. Examples 22 and 23 are duplicates of examples 10 and 11 above. Example 25 is similar to example 12 above; both were produced with 8.5 wt % HFO-1243zf, but example 25 was found to be of better quality (fewer defects, lower density). The melt temperature in example 25 was 125° C. while the melt temperature in example 12 in the original application was 117° C. The results are shown in Table 3 and plotted in FIG. 1.

Examples 26 to 28 were produced using trans-HCFO-1233zd as the only blowing agent at loadings ranging from 8.6 to 11.7 wt %. The results are shown in Table 3 and plotted in FIG. 1.

Examples 29 to 37 were produced using blowing agent combinations of from 38 wt % 66 wt % HFO-1243zf and from 62 wt % to 34 wt % trans-HCFO-1233zd as the blowing agents. The total loading of blowing agent ranged from 8.2 to 12.5 wt %. Examples 33 and 34 duplicates of examples 13 and 14 above. The results are shown in Table 3 and plotted in FIG. 1.

TABLE 2

| | Blowing Agent Loading | | | | Polystyrene Resin | | | Foam Properties | | |
|---|---|---|---|---|---|---|---|---|---|---|
| Example | 134a (wt %) | TFP (wt %) | 1234yf (wt %) | 1233zd (wt %) | Feed (kg/hr) | MFI (g/10 min) | $T_{melt}$ (° C.) | Density (kg/m$^3$) | Cell Size (mm) | OCC (%) |
| 9 | 6.4 | — | — | — | 2.27 | 4.0 | 111 | 60.9 | 0.06 | 23 |
| 10 | — | 6.6 | — | — | 2.27 | 11.0 | 114 | 57.6 | 0.11 | <5 |
| 11 | — | 7.2 | — | — | 2.27 | 11.0 | 115 | 56.5 | 0.11 | <5 |
| 12 | — | 8.5 | — | — | 4.54 | 4.0 | 117 | 58.0 | 0.06 | <5 |
| 13 | — | 4.1 | — | 6.6 | 4.54 | 11.0 | 113 | 44.3 | 0.29 | <5 |
| 14 | — | 6.5 | — | 3.4 | 4.54 | 11.0 | 113 | 52.5 | 0.35 | <5 |
| 15 | — | — | 4.4 | — | 4.54 | 11.0 | 117 | 90.9 | 0.15 | 5 |
| 16 | — | — | 5.7 | — | 4.54 | 11.0 | 115 | 71.6 | 0.06 | 31.4 |
| 17 | — | — | 4.2 | 4.3 | 4.54 | 11.0 | 114 | 55.2 | 0.12 | <5 |
| 18 | — | — | 4.8 | 5.0 | 4.54 | 11.0 | 113 | 53.5 | 0.08 | <5 |

Examples 19-48

Extruded polystyrene foam was produced using a counter-rotating twin screw extruder with internal barrel diameters or 27 mm and a barrel length of 40 diameters. The screw design was suitable for foaming applications. The pressure in the extruder barrel was controlled with a gear pump and was set high enough such that the blowing agent dissolved in the extruder. The extruder die was an adjustable-lip slot die with a gap width of 6.35 mm. Two grades of general purpose polystyrene was used for the extrusion experiments and fed to the extruder at an overall rate of 4.54 kg/hr (10 lb/hr). Blowing agents were pumped into the polystyrene resin melt at a controlled rate using high pressure delivery pumps. In the extruder, the blowing agent mixed with and dissolved in the resin melt to produce an expandable resin composition. The expandable resin composition was cooled to an appropriate foaming temperature and then extruded from the die where the drop in pressure initiates foaming. Talc was used as a nucleating agent at 0.5 wt % talc in polystyrene.

Examples 38 to 48 were produced using blowing agent combinations of from 33 wt % to 53 wt % HFO-1243zf, 28 wt % to 52 wt % trans-HCFO-1233zd, and from 13 wt % to 20 wt % carbon dioxide (CO2). The total blowing agent loading ranged from 7.6 to 11.3 wt %. The results are shown in Table 3 and plotted in FIG. 1.

The blowing agent formulations for examples 19 to 48 are shown in Table 3 along with the foam density. With the exception of Example 28, all foams shown in Table 3 had an open cell content <10%. Example 28, blown using 11.7 wt % trans-HCFO-1233zd, had an open cell content ~13%. With the exception of Example 48, all foams shown in Table 3 had a cell size 0.1 mm.

FIG. 1 shows a plot of total blowing agent content versus foam density for examples 19 to 48. As mentioned above, the data are divided into four series: 1) Examples 19 to 25 for HFO-1243zf; 2) Examples 26 to 28 for trans-HCFO-1233zd; 3) Examples 29 to 37 for combinations of HFO-1243zf and trans-HCFO-1233zd (1243zf/1233zd); 4) Examples 38 to 48 for combinations of HFO-1243zf, trans-HCFO-1233zd, and carbon dioxide (1243zf/1233zd/CO2). Trend lines for each series show the minimum density achieved for each blowing agent combination. The data shows that using the blowing agent combinations of 1243zf/1233zd or 1243zf/1233zd/$CO_2$ permit production of low density foam over a wider range of blowing agent loadings than either 1243zf or 1233zd alone. For example, examples 25 and 26 blown with approximately 8.5 wt % 1243zf and 1233zd respectively. Examples 29-30 and 40-42, blown with 1243zf/1233zd and 1243zf/1233zd/CO2 respectively, are of significantly lower density but blown using about the same amount of blowing agent or less. Also, the foam of example 25 had a cell size <0.1 mm whereas all foams of Examples 29-30 and 38-42 had cell sizes of from 0.1-0.3 mm. As shown in examples 36 and 47, blown with 1243zf/1233zd and 1243zf/1233zd/$CO_2$ respectively, it was possible to produce closed-cell foam with cell sizes >0.1 mm with density less than 40 kg/m$^3$.

autoclave was then opened and the foam sample removed and analyzed. Results are summarized in Table 4, which lists the blowing agent combination used (with composition listed to within +/−1 wt %), weight of PS resin used, and the resulting foam density. In these examples, "1234ze(E)" refers to the trans-isomer of HFO-1234ze, "1234yf" refers to HFO-1234yf, "1233zd(E)" refers to the trans-isomer of HCFO-1233zd, and "245fa" refers to HFC-245fa. The results show that using the blowing agent combination of 1234ze(E) with 1233zd(E) permitted production of lower density foam, with a density <50 kg/m$^3$, than using 1234ze(E) alone and also lower than the combination of the 1234ze(E) with another HFO, in this example 1234yf, or the combination of the 1234ze(E) with an HFC, this example 245fa, which both resulted in foam density that was higher than the 1234ze(E) alone.

TABLE 3

| | Blowing Agent Composition | | | Blowing Agent Loading | | | Total Blowing | |
|---|---|---|---|---|---|---|---|---|
| Example | 1243zf (wt %) | 1233zd (wt %) | CO2 (wt %) | 1243zf (wt %) | 1233zd (wt %) | CO2 (wt %) | Agent Loading (wt %) | Density (kg/m$^3$) |
| 19 | 100% | — | — | 4.1 | — | — | 4.1 | 84.1 |
| 20 | 100% | — | — | 4.9 | — | — | 4.9 | 70.2 |
| 21 | 100% | — | — | 5.8 | — | — | 5.8 | 60.7 |
| 22 | 100% | — | — | 6.6 | — | — | 6.6 | 57.6 |
| 23 | 100% | — | — | 7.9 | — | — | 7.2 | 56.5 |
| 24 | 100% | — | — | 7.2 | — | — | 7.2 | 51.9 |
| 25 | 100% | — | — | 8.5 | — | — | 8.5 | 53.3 |
| 26 | — | 100% | — | — | 8.6 | — | 8.6 | 72.2 |
| 27 | — | 100% | — | — | 10.2 | — | 10.2 | 42.4 |
| 28 | — | 100% | — | — | 11.7 | — | 11.7 | 55.5 |
| 29 | 65% | 35% | — | 5.3 | 2.9 | — | 8.2 | 46.8 |
| 30 | 65% | 35% | — | 5.3 | 2.9 | — | 8.2 | 50.6 |
| 31 | 49% | 51% | — | 4.6 | 4.9 | — | 9.5 | 45.2 |
| 32 | 49% | 51% | — | 4.6 | 4.9 | — | 9.5 | 43.2 |
| 33 | 49% | 51% | — | 4.6 | 4.9 | — | 9.5 | 44.7 |
| 34 | 66% | 34% | — | 6.5 | 3.4 | — | 9.9 | 52.5 |
| 35 | 38% | 62% | — | 4.1 | 6.6 | — | 10.7 | 44.3 |
| 36 | 45% | 55% | — | 5.5 | 6.2 | — | 12.1 | 38.3 |
| 37 | 38% | 62% | — | 4.8 | 7.7 | — | 12.5 | 41.8 |
| 38 | 52% | 28% | 20% | 4.0 | 2.1 | 1.5 | 7.6 | 46.9 |
| 39 | 53% | 29% | 19% | 4.2 | 2.3 | 1.5 | 8.0 | 48.1 |
| 40 | 53% | 29% | 18% | 4.5 | 2.4 | 1.5 | 8.4 | 47.6 |
| 41 | 53% | 29% | 18% | 4.5 | 2.4 | 1.5 | 8.4 | 42.9 |
| 42 | 33% | 49% | 17% | 2.9 | 4.2 | 1.5 | 8.6 | 42.1 |
| 43 | 34% | 50% | 16% | 3.0 | 4.5 | 1.5 | 9.1 | 43.2 |
| 44 | 43% | 41% | 16% | 3.9 | 3.8 | 1.5 | 9.2 | 45.8 |
| 45 | 43% | 41% | 17% | 3.9 | 3.8 | 1.5 | 9.2 | 41.9 |
| 46 | 34% | 50% | 16% | 3.2 | 4.8 | 1.5 | 9.5 | 41.0 |
| 47 | 34% | 51% | 15% | 3.6 | 5.3 | 1.5 | 10.4 | 39.8 |
| 48 | 35% | 52% | 13% | 3.9 | 5.9 | 1.5 | 11.3 | 40.1 |

Examples 49-55

Batch Foaming

Batch-wise foaming experiments were conducted in 300 mL stainless steel autoclaves. For each example, approximately 6 gm of polystyrene powder was loaded into the autoclave (except for Comp. Ex, 49, where 8 gm was used). The autoclave was sealed and then evacuated to vacuum. Approximately 30-50 gm of total blowing agent was then charged to the autoclave; if multiple blowing agents were used, each was charged separately. The autoclave was then heated to achieve to the desired temperature and elevated pressure and then maintained at that temperature for about 24 hours. To initiate foaming after the 24 hour wait period, the autoclave was rapidly degassed by opening a vent port. The Example 54 had a fine cell structure with an average cell size of <1 mm. Comparative Example 51 had a coarser cell structure with an average cell size of >1 mm.

TABLE 4

Batch Foaming of PS

| Example | Blowing Agent | Foam Density (kg/m$^3$) |
|---|---|---|
| Comp. Ex. 49 | 1234yf (100 wt %) | 228 |
| Comp. Ex. 50 | 1234ze(E) (100 wt %) | 75.0 |
| Comp. Ex. 51 | 1233zd(E) (100 wt %) | 29.7 |
| Comp. Ex. 52 | 1234ze(E)/1234yf (50 wt %/50 wt %) | 115 |

TABLE 4-continued

Batch Foaming of PS

| Example | Blowing Agent | Foam Density (kg/m$^3$) |
| --- | --- | --- |
| Comp. Ex. 53 | 1234ze(E)/245fa (50 wt %/50 wt %) | 86.7 |
| Example 54 | 1234ze(E)/1233zd(E) (50 wt %/50 wt %) | 38.6 |
| Example 55 | 1234ze(E)/1233zd(E) (74 wt %/26 wt %) | 62.5 |

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A thermoplastic foam product comprising a blowing agent composition comprising a combination of 3,3,3-trifluoropropene and 2 wt % to about 90 wt % 1-chloro-3,3,3-trifluoropropene wherein thermoplastic foam product has a density less than about 24-50 kg/m$^3$ at a blowing agent loading of from about 7 to about 13 wt %.

2. The thermoplastic foam product of claim 1 wherein said blowing agent composition comprises about 5 wt % to about 80 wt % of said 1-chloro-3,3,3-trifluoropropene.

3. The thermoplastic foam product of claim 1 wherein said blowing agent composition comprises from about 10 wt % to about 70 wt % of said 1-chloro-3,3,3-trifluoropropene.

4. The thermoplastic foam product of claim 1 wherein said blowing agent composition comprises from about 20 wt % to about 65 wt % of said 1-chloro-3,3,3-trifluoropropene.

5. The thermoplastic foam product of claim 1 wherein said blowing agent composition comprises from about 30 wt % to about 60 wt % of said 1-chloro-3,3,3-trifluoropropene.

6. The thermoplastic foam product of claim 1 where said 1-chloro-3,3,3-trifluoropropene comprises greater than 75% of the trans-isomer.

7. The thermoplastic foam product of claim 1 wherein said thermoplastic foam product has a density less than about 38-50 kg/m$^3$.

8. The thermoplastic foam product of claim 1 wherein said blowing agent composition further comprises a coblowing agent selected from the group consisting of hydrofluorocarbons, alkanes, carbon dioxide, methyl formate, inert gases, atmospheric gases, alcohols, ethers, fluorinated ethers, unsaturated fluorinated ethers, ketones, fluoroketones, water, and mixtures thereof.

9. The thermoplastic foam product of claim 8 wherein said hydrofluorocarbon is selected from HFC-32, HFC-161, HFC-152, HFC-152a, HFC-143, HFC-143a, HFC-134, HFC-134a, HFC-125, HFC-245fa, HFC-365mfc, HFC-227ea, or mixtures thereof.

10. The thermoplastic foam product of claim 8 wherein said hydrofluorocarbon is selected from HFC-134a, HFC-152a, HFC-32, HFC-143a, HFC-245fa, or mixtures thereof.

11. The thermoplastic foam product of claim 8 wherein said alkane is selected from propane, butane, pentane, or hexane.

12. The thermoplastic foam product of claim 11 wherein said pentane is selected from n-pentane, cyclopentane, isopentane or mixtures thereof.

13. The thermoplastic foam product of claim 8 wherein said alcohol is selected from ethanol, iso-propanol, butanol, ethyl hexanol, methanol, or mixtures thereof.

14. The thermoplastic foam product of claim 8 wherein said ether is selected from dimethyl ether, diethyl ether, methylethyl ether, or mixtures thereof.

15. The thermoplastic foam product of claim 8 wherein said ketone is selected from acetone, methyl ethyl ketone, or mixtures thereof.

16. The thermoplastic foam product of claim 1 wherein said thermoplastic is selected from polystyrene, polyethylene, polypropylene, or mixtures thereof.

17. The thermoplastic foam product of claim 1 wherein said blowing agent composition further comprises an additive selected from the group consisting of dyes, pigments, cell-controlling agents, fillers, antioxidants, extrusion aids, stabilizing agents, antistatic agents, fire retardants, IR attenuating agents, thermally insulating additives, plasticizers, viscosity modifiers, impact modifiers, gas barrier resins, carbon black, surfactants, and mixtures thereof.

* * * * *